United States Patent
Mann

(10) Patent No.: US 8,511,619 B2
(45) Date of Patent: Aug. 20, 2013

(54) SLAT DEPLOYMENT MECHANISM

(75) Inventor: Alan Mann, Bristol (GB)

(73) Assignee: Airbus Operations Limited, Bristol (GB)

( * ) Notice: Subject to any disclaimer, the term of this patent is extended or adjusted under 35 U.S.C. 154(b) by 353 days.

(21) Appl. No.: 12/921,582

(22) PCT Filed: Mar. 12, 2009

(86) PCT No.: PCT/GB2009/050239
§ 371 (c)(1),
(2), (4) Date: Sep. 9, 2010

(87) PCT Pub. No.: WO2009/118547
PCT Pub. Date: Oct. 1, 2009

(65) Prior Publication Data
US 2011/0036944 A1    Feb. 17, 2011

(30) Foreign Application Priority Data
Mar. 28, 2008   (GB) .................................. 0805599.8

(51) Int. Cl.
*B64C 9/22* (2006.01)
*B64C 3/50* (2006.01)
*B64C 13/34* (2006.01)

(52) U.S. Cl.
USPC .......................................... 244/214; 244/99.3

(58) Field of Classification Search
USPC ........................ 244/210, 213, 214, 99.2, 99.3
See application file for complete search history.

(56) References Cited

U.S. PATENT DOCUMENTS

| | | | |
|---|---|---|---|
| 2,938,680 A | | 5/1960 | Greene et al. |
| 2,990,140 A * | | 6/1961 | Mazelsky ..................... 244/210 |
| 3,272,458 A | | 9/1966 | Bracka |
| 3,847,369 A | | 11/1974 | Phillips et al. |
| 5,158,252 A | | 10/1992 | Sakurai |
| 5,230,487 A | | 7/1993 | Gartelmann et al. |
| 8,245,982 B2 * | | 8/2012 | Vormezeele et al. ......... 244/214 |
| 2007/0102587 A1 | | 5/2007 | Jones et al. |

FOREIGN PATENT DOCUMENTS

| | | | |
|---|---|---|---|
| DE | 10328540 A1 * | 2/2005 | |
| GB | 517422 A * | 1/1940 | |
| GB | 2073681 A | 10/1981 | |
| GB | 2458683 A * | 9/2009 | |

OTHER PUBLICATIONS

ISR for PCT/GB2009/050239 mailed Sep. 30, 2009.
British Search Report for GB0805599.8 dated Jul. 11, 2008.

* cited by examiner

*Primary Examiner* — Joseph W Sanderson
(74) *Attorney, Agent, or Firm* — Lowe Hauptman Ham & Berner, LLP

(57) ABSTRACT

An aircraft slat deployment mechanism including a first drive member coupled to a slat at a first pivot point and a second drive member coupled to the slat at a second pivot point offset from the first pivot point. A first rack is provided on the first drive member, and a first pinion is carried by the drive shaft. The first pinion is arranged to transmit mechanical power from the drive shaft to the first drive member via the first rack. A second rack is provided on the second drive member, and a second pinion is carried by the drive shaft. The second pinion has a different radius to the first pinion. The second pinion is arranged to transmit mechanical power from the drive shaft to the second drive member via the second rack, such that the first and second drive members move at a different speed.

11 Claims, 4 Drawing Sheets

SLAT DEPLOYMENT MECHANISM

RELATED APPLICATIONS

The present application is based on International Application Number PCT/GB2009/050239, filed Mar. 12, 2009, and claims priority from, British Application Number 0805599.8, filed Mar. 28, 2008, the disclosures of which are hereby incorporated by reference herein in their entirety.

FIELD OF THE INVENTION

The present invention relates to a mechanism for deploying an aircraft slat, and a method of deploying an aircraft slat using such a mechanism.

BACKGROUND OF THE INVENTION

Leading edge slats are commonly used and well understood. They are commonly driven on a circular track mechanism.

The simple circular track restricts design freedom when optimising both take-off and landing slat settings. Non-circular tracks are not generally used due to loads and kinematic complications. Applying an additional rotation to the slat beyond that provided by the track deployment enables greater design freedom. For example this allows a sealed setting at take-off where drag performance is important and a slotted setting at landing where CLmax is the design driver.

The track is commonly long and, when stowed, extends aft through the wing front structural spar. This requires a slat track "can" to be installed at each slat track to seal the fuel tank, reducing the fuel volume, and adding time and cost to the manufacture of the wing. Adding holes is especially inefficient for composite wing spars. Thus there is a strong driver to avoid front spar penetration in wing spars by the high lift mechanism. Once again applying an additional rotation to the slat enables a shorter track to be used whilst achieving a similar maximum slat deployment angle.

Double action slat mechanisms achieving an additional rotation about the slat heel exist. The most common form generates the additional rotation through the addition of a follower arm that is guided through a contoured rail as the slat is deployed by the track. An example is described in U.S. Pat. No. 3,272,458. A track is mounted within guide rollers, and driven by a rack and pinion mechanism. Rotation of the slat is effected by a push-pull rod driven by a bell crank which is carried by the track. One arm of the bell crank carries a cam follower which is entrapped within a camming track.

SUMMARY OF THE INVENTION

A first aspect of the invention provides an aircraft slat deployment mechanism comprising: a first drive member coupled to the slat at a first pivot point; a second drive member coupled to the slat at a second pivot point which is offset from the first pivot point; a drive shaft; a first rack on the first drive member; a first pinion carried by the drive shaft, the first pinion being arranged to transmit mechanical power from the drive shaft to the first drive member via the first rack; a second rack on the second drive member; and a second pinion carried by the drive shaft and having a different radius to the first pinion, the second pinion being arranged to transmit mechanical power from the drive shaft to the second drive member via the second rack, such that the second drive member moves at a different speed to the first drive member.

By using a pair of parallel transmission mechanisms from the drive shaft, the invention enables the two drive members to be driven more precisely than in U.S. Pat. No. 3,272,458 where only a single (rack and pinion) transmission mechanism is provided. Also, by dividing the power between two rack and pinion transmission mechanisms, an element of redundancy can be built into the mechanism. Also, the mechanism can be made more compact than in U.S. Pat. No. 3,272,458.

The first and second drive members may comprise curved tracks. Alternatively the first and/or second drive member may comprise a non-curved carriage which is driven along a stationary guide, a drive rod, or any other suitable drive member.

Typically the mechanism further comprises a first bearing arranged to guide the first drive member along a first curved path; and a second bearing arranged to guide the second drive member along a second curved path. The bearings may comprise rolling-element bearings (which may use cylindrical, spherical or any other suitably shaped rolling elements) or plane bearings without rolling elements.

The first and second bearings may both be carried by the main wing element. Alternatively the second bearing may comprise an internal bearing between the drive members. In this case the second drive member can be at least partially nested within a channel defined by the first drive member.

A second aspect of the invention provides a method of deploying an aircraft slat with a first drive member coupled to the slat at a first pivot point and a second drive member coupled to the slat at a second pivot point which is offset from the first pivot point, the method comprising transmitting mechanical power from a drive shaft to the first drive member via a first rack on the first drive member and a first pinion carried by the drive shaft; and transmitting mechanical power from the drive shaft to the second drive member via a second rack on the second drive member and a second pinion carried by the drive shaft, the second pinion having a different radius to the first pinion such that the second drive member moves at a different speed to the first drive member and rotates the slat about the first pivot point.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
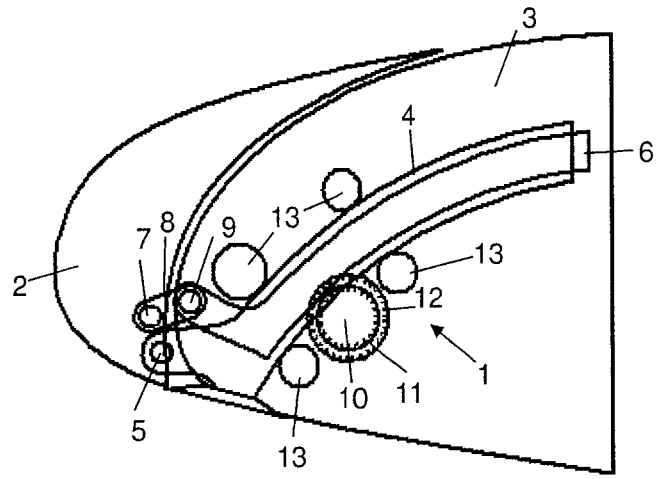
FIG. 1 is a schematic side view of a first slat deployment mechanism showing the slat in its fully retracted position.

FIG. 1 is a schematic side view of a slat deployment mechanism 1 according to a first embodiment of the invention, acting between a slat 2 and a main wing element 3. The mechanism 1 comprises a curved main track 4 which is coupled to the heel of the slat 2 at a first pivot point 5, and a curved secondary track 6 which is coupled to the slat at a second pivot point 7 by a pivoting drive link 8. The drive link 8 is pivotally coupled to the distal end of the secondary track 6 at a third pivot point 9.

A drive shaft 10 running in a span-wise direction along the wing carries a first pinion 11 and a second pinion 12. Although not apparent from the side view of FIG. 1, the pinions 11, 12 are spaced apart axially along the drive shaft 10 as shown more clearly in FIG. 4. The first pinion 11 has a smaller radius than the second pinion 12. The first pinion 11 is coupled with a toothed rack on the main track 4 and the second pinion 12 is coupled with a second toothed rack on the secondary track 6.

The main track 4 is guided along a curved path 15 by a main bearing defined by a set of rollers 13. The rollers 13 are carried by a slat track support rib (not shown) which forms part of the main wing element 3. As the pinion 11 rotates, the main track 4 is driven along the curved path 15. The tracks 4, 6 and the path 15 are shaped as substantially concentric arcs of a circle, centred on a point indicated approximately at 16 in FIG. 3.

Figure 4:
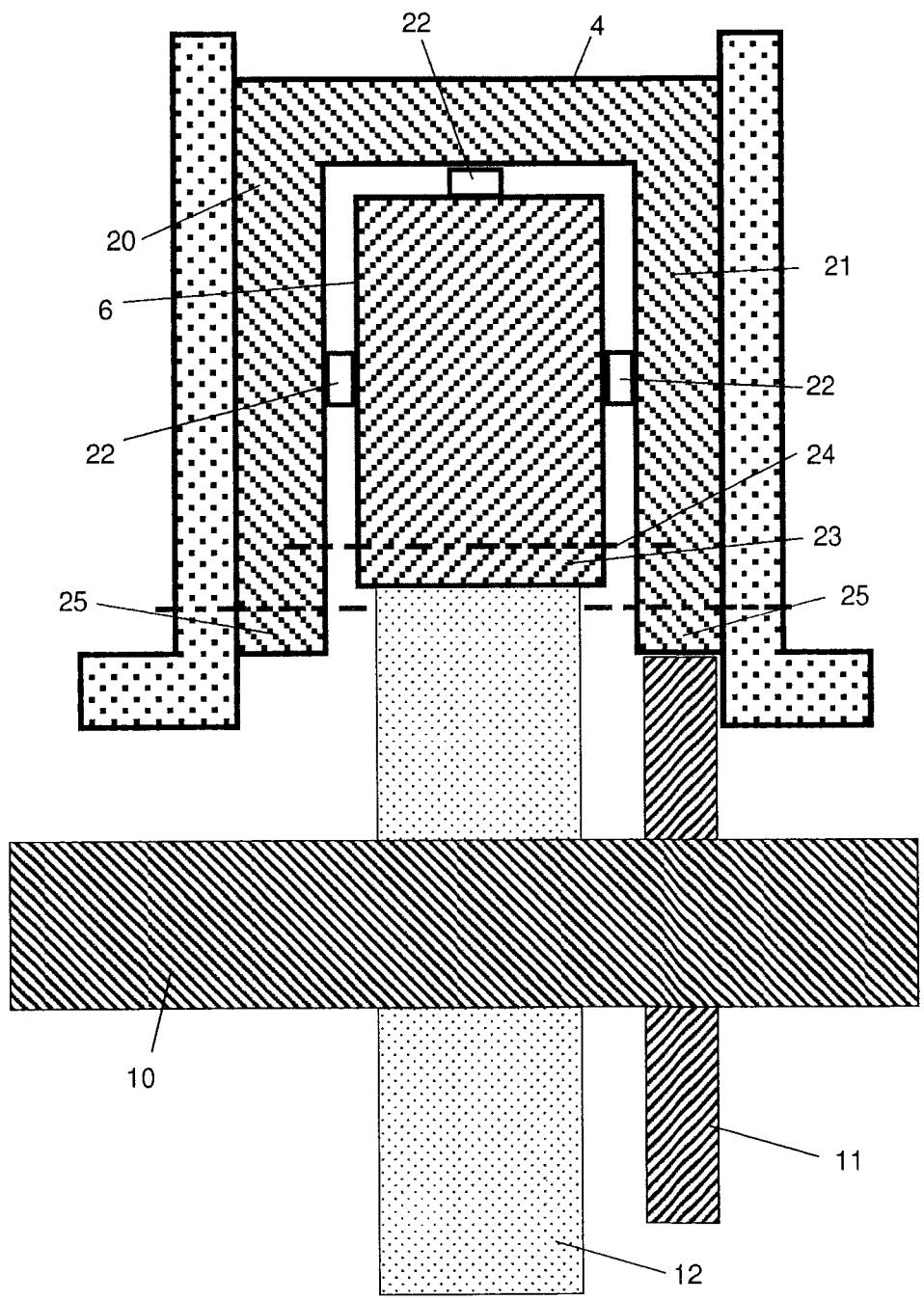
FIG. 4 is a cross-sectional view through the tracks and pinions.

Referring to FIG. 4, the secondary track 6 is nested within a channel in the main track 4, which is open on its lower side to accommodate the pinion 12. Specifically, the main track 4 is U-shaped in cross-section with a pair of spaced apart walls 20, 21 which define the channel receiving the secondary track 6. A set of rollers 22 act as an internal bearing between the tracks 4, 6. Three of such rollers 22 are shown in the sectional view of FIG. 4, and further rollers (not shown) are distributed along the length of tracks. The rollers 22 may be carried by the secondary track 6 or by the main track 4, or may be free to move within the space between the tracks 4,6.

The secondary track 6 has a rack comprising a series of teeth extending from its lower side, one of the teeth 23 being shown in FIG. 4 with the midpoint between the base and top of the tooth being indicated by a dashed line 24. The pinion 12 has a set of teeth which engage with the rack on the secondary track 6, so as to drive the secondary track 6 along its respective curved path. Similarly, the smaller pinion 11 has a set of teeth which engage with a rack on the lower side of the main track 4, one of the rack teeth being indicated at 25 in FIG. 4.

Figure 2:
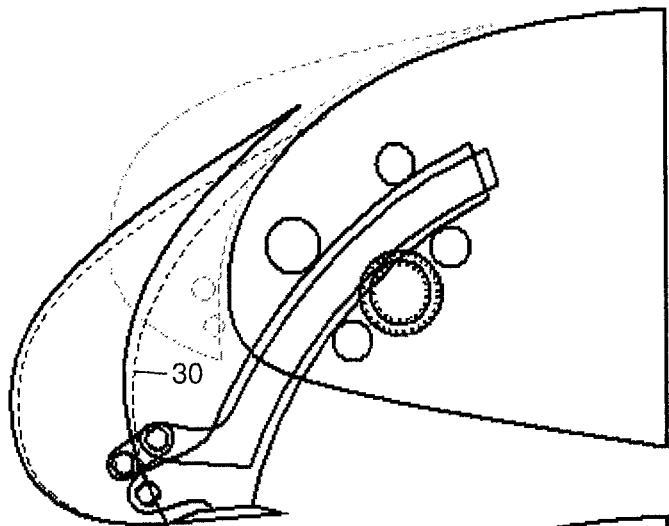
FIG. 2 is a view of the slat deployment mechanism in an intermediate position.
Figure 3:
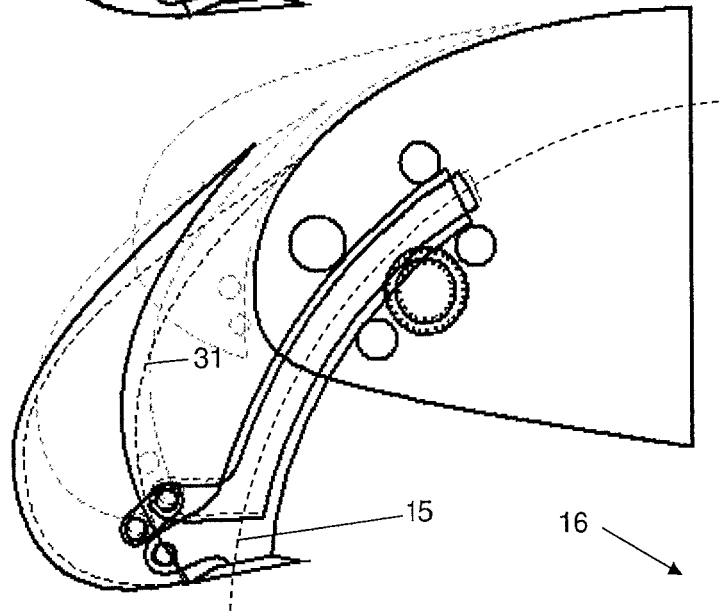
FIG. 3 is a view of the mechanism in a fully deployed position.

The larger radius of the pinion 12 causes a differential speed between the tracks 4, 6 giving a resultant motion illustrated in FIGS. 2 and 3. In the intermediate position shown in FIG. 2, the higher speed of the secondary track 6 causes a small anti-clockwise rotation of the slat 2 about the pivot point 5. The position of the slat with this rotation is shown in solid line in FIG. 2, and the position that the slat would adopt in the absence of such differential motion is illustrated by a dashed line 30.

The fully deployed position of the slat is shown in FIG. 3. Again, the natural position of the slat (incorporating the differential motion between the tracks) is shown in solid line, and a dashed line 31 illustrates the position that the slat would adopt in the absence of this differential rotation.

Figure 5:
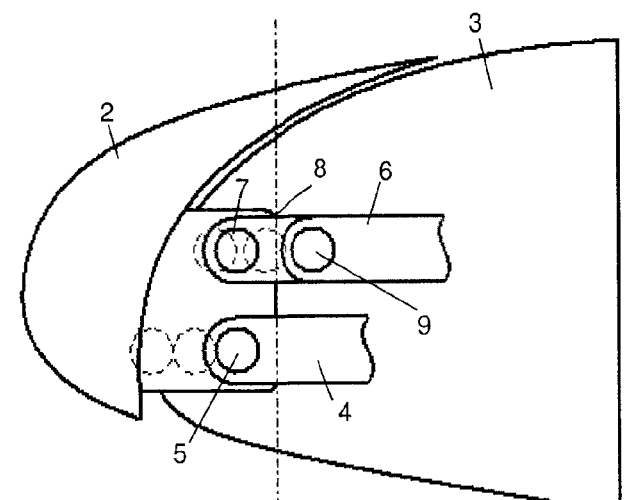
FIG. 5 is a schematic side view of a second slat deployment mechanism with the slat in its fully retracted position.
Figure 6:
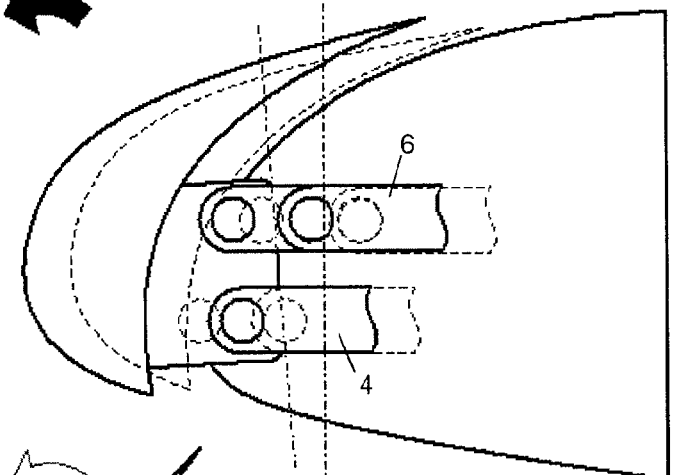
FIG. 6 is a view of the mechanism with the slat in an intermediate position.
Figure 7:
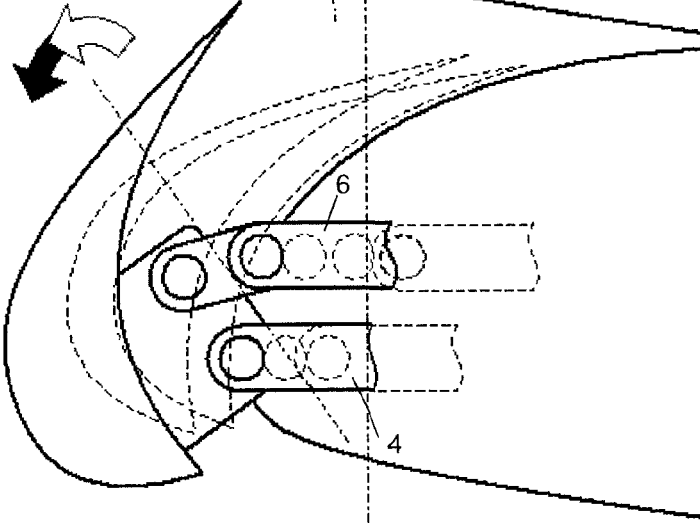
FIG. 7 is a view of the mechanism with the slat fully deployed.

FIGS. 5-7 illustrate how the slat deployment mechanism of FIG. 1 can be adjusted to give a different motion during deployment. Only the distal ends of the tracks 4, 6 are shown, for purposes of clarity. Also, the tracks 4, 6 are illustrated schematically as being straight in FIGS. 5-7 for purposes of clarity, but in practice they will be curved as shown in FIGS. 1-3.

In the retracted position of FIG. 5 the link 8 is aligned with the secondary track 6, and as the slat rotates to the deployed position of FIG. 7, the link 8 rotates relative to the secondary track 6 as shown.

Figure 8:
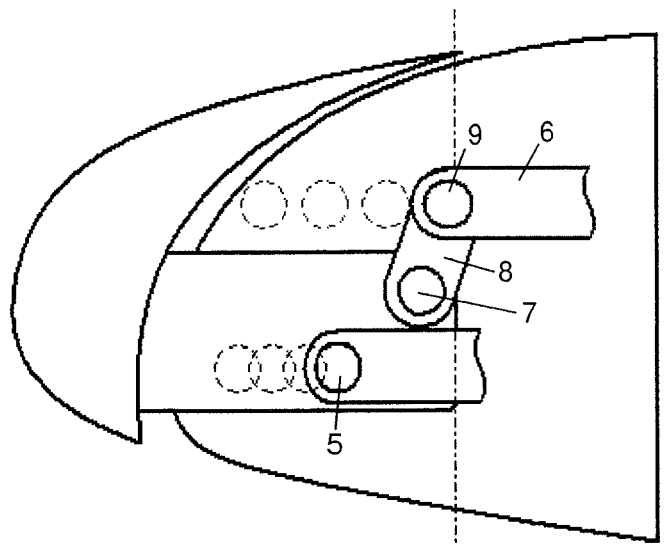
FIG. 8 is a schematic side view of a third slat deployment mechanism.
Figure 9:
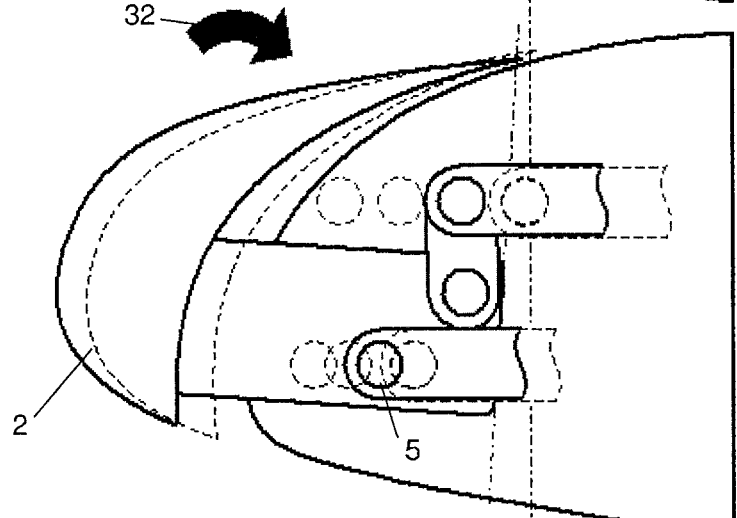
FIG. 9 shows the slat in an intermediate position.
Figure 10:
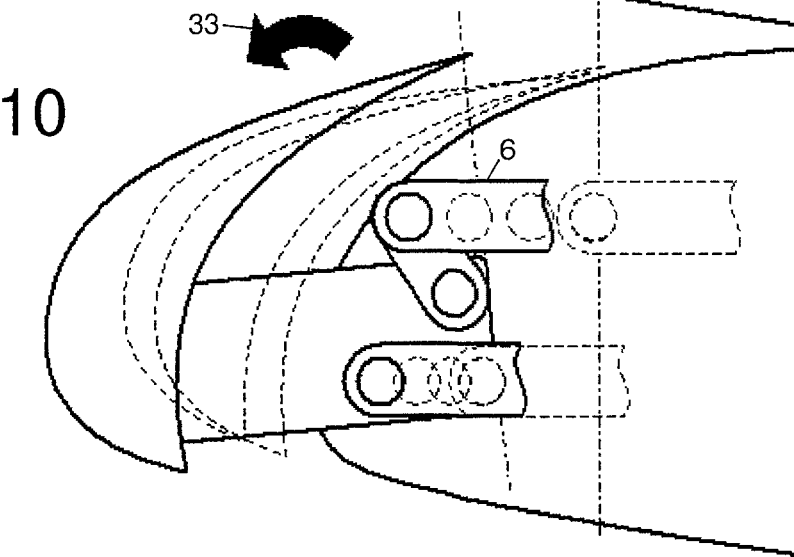
FIG. 10 shows the slat in a fully deployed position.

In the alternative arrangement of FIGS. 8-10, in the retracted position of FIG. 8 the link 8 is at an angle to the secondary track 6 with the pivot 9 positioned aft of the pivot 7. Thus in the intermediate setting of FIG. 9, the slat 2 has moved away from the main wing element and rotated slightly clockwise about the pivot point 5, as indicated by arrow 32. As the slat moves to the deployed position of FIG. 10 the pivot 9 moves forward of the pivot 7 and the slat rotates anticlockwise as indicated by arrow 33.

In the nested arrangement shown in FIG. 4, the track 6 functions as a drive member which is driven along the main track 4 by the pinion 12 guided by the internal bearing 22, as the main track 4 is driven along the curved path 15 guided by the rollers 13. The tracks 4,6 are at the same span-wise position and mounted to the main wing element by a single set of rollers 13. In an alternative embodiment (not shown) instead of being driven along the track 4, the track 6 may be spaced apart from the track 4 in a span-wise direction with each being carried by a respective set of guide rollers on a respective slat track support rib. In this case, the slat may be held by three tracks, one of which (most likely the one in the middle) corresponds with the secondary track 6, and two of which correspond with the main track 4.

This non-nested arrangement reduces the complexity of the telescopic motion, and does not require the internal bearings 22 which are required in the nested arrangement of FIG. 4. It also enables the tracks to have different radii of curvature, thus providing additional design freedom.

In the examples described in FIGS. 1-10, the secondary track 6 requires an additional link 8 due to the changing distance between the pivot 7 and the pivot 9. This change will be small, so instead of using a pivoting link 8, the pivot 9 may instead be accommodated by fitting it into a short vertical slot in the slat structure. Alternatively the track 6 may be designed, in terms of the deployment locus, to avoid the need for such refinements.

In summary, the embodiments illustrated in FIGS. 1-10 achieve a non-circular slat deployment through the differential deployment of two circular tracks of different radii. Pinions of two different radii drive the two tracks. Thus the tracks are driven to slightly different extents, creating a rotation at the extreme end where they are connected by hinges to the slat heel. Only a small amount of differential motion is required to provide a useful amount of additional slat rotation. The mechanism enables additional slat rotation with a shorter track thus eliminating front spar penetration by the mechanism.

The two pinions 11,12 are driven off the same drive shaft and gearbox, and thus transmit mechanical power from the drive shaft to the two tracks 4,6 via parallel transmission paths. The larger radius of the pinion 12 ensures that the track 6 moves at a higher speed than the track 4.

Although the invention has been described above with reference to one or more preferred embodiments, it will be appreciated that various changes or modifications may be made without departing from the scope of the invention as defined in the appended claims.

The invention claimed is:

1. An aircraft slat deployment mechanism comprising:
   a first drive member coupled to the slat at a first pivot point;
   a second drive member coupled to the slat at a second pivot point which is offset from the first pivot point;
   a drive shaft;

a first rack on the first drive member;

a first pinion carried by the drive shaft, the first pinion being arranged to transmit mechanical power from the drive shaft to the first drive member via the first rack;

a second rack on the second drive member; and a second pinion carried by the drive shaft and having a different radius to the first pinion, the second pinion being arranged to transmit mechanical power from the drive shaft to the second drive member via the second rack, such that the second drive member moves at a different speed to the first drive member.

2. The mechanism of claim 1 wherein at least one of the first or the second drive member comprises a curved track.

3. The mechanism of claim 1 further comprising a first bearing arranged to guide the first drive member along a first curved path; and a second bearing arranged to guide the second drive member along a second curved path.

4. The mechanism of claim 3 wherein at least one of the first or the second bearing comprises one or more rolling-elements.

5. The mechanism of claim 3 further comprising a main wing element, wherein the first and second bearings are both carried by the main wing element.

6. The mechanism of claim 5 wherein at least one of the first or the second bearing comprises one or more rolling-elements.

7. The mechanism of claim 3 wherein the second bearing comprises an internal bearing between the drive members.

8. The mechanism of claim 7 wherein the second drive member is at least partially nested within a channel defined by the first drive member.

9. The mechanism claim 1 wherein the first and second drive members are spaced apart from each other in a spanwise direction.

10. The mechanism of claim 1 wherein the second drive member is coupled to the slat by a pivoting link.

11. A method of deploying an aircraft slat with a first drive member coupled to the slat at a first pivot point and a second drive member coupled to the slat at a second pivot point which is offset from the first pivot point, the method comprising:

transmitting mechanical power from a drive shaft to the first drive member via a first rack on the first drive member and a first pinion carried by the drive shaft; and transmitting mechanical power from the drive shaft to the second drive member via a second rack on the second drive member and a second pinion carried by the drive shaft, the second pinion having a different radius to the first pinion such that the second drive member moves at a different speed to the first drive member and rotates the slat about the first pivot point.

* * * * *